United States Patent
Diehl et al.

(10) Patent No.: US 9,926,963 B2
(45) Date of Patent: Mar. 27, 2018

(54) METHOD FOR THE CONNECTION OF SHEET METAL PARTS AND COMPONENT ASSEMBLY AS WELL AS SETTING HEAD AND DIE BUTTON

(71) Applicant: PROFIL Verbindungstechnik GmbH & Co. KG, Friedrichsdorf (DE)

(72) Inventors: Oliver Diehl, Bad Homburg (DE); Andreas Lembach, Darmstadt (DE)

(73) Assignee: PROFIL VERBINDUNGSTECHNIK GMBH & CO. KG, Friedrichsdorf (DE)

( * ) Notice: Subject to any disclaimer, the term of this patent is extended or adjusted under 35 U.S.C. 154(b) by 656 days.

(21) Appl. No.: 14/533,361

(22) Filed: Nov. 5, 2014

(65) Prior Publication Data
US 2015/0125201 A1    May 7, 2015

(30) Foreign Application Priority Data

Nov. 6, 2013   (DE) .......................... 10 2013 222 569
Sep. 17, 2014  (DE) .......................... 10 2014 113 438

(51) Int. Cl.
*F16B 37/06*   (2006.01)
*F16B 5/04*    (2006.01)
(Continued)

(52) U.S. Cl.
CPC ........... *F16B 37/062* (2013.01); *B21J 15/025* (2013.01); *B29C 65/562* (2013.01);
(Continued)

(58) Field of Classification Search
CPC ....... B21J 15/02; B21J 15/025; B29C 65/562; B29C 66/1122; B29C 66/21; B29C 66/41;
(Continued)

(56) References Cited

U.S. PATENT DOCUMENTS 5,009,557 A * 4/1991 Dessirier ................. B21J 15/02
                                                    29/524.1
8,950,707 B2 * 2/2015 Bense ..................... F16B 19/08
                                                    244/131
(Continued)

FOREIGN PATENT DOCUMENTS

CN   103261004 A   8/2013
DE   19701088 A1   7/1998
(Continued)

OTHER PUBLICATIONS

European Patent Office Communication dated Aug. 24, 2016 for European Patent Application No. 14 191 924.1, 6 pages.

*Primary Examiner* — Daniel J Wiley
(74) *Attorney, Agent, or Firm* — Cantor Colburn LLP

(57) ABSTRACT

A method for the connection of sheet parts, of which at least one is formed as an organic sheet part, with the aid of an auxiliary joining part and an apertured metal washer, the auxiliary joining part having a functional section with an undercut and a piercing section with a shaft surface and a shaft recess. The sheet parts and the metal washer are brought into a stacked arrangement in such a way that the metal washer contacts the organic sheet part. The piercing section slugs are punched out of the stacked sheet parts. The auxiliary joining part is joined to the metal washer. The other of the undercut or of the shaft recess is brought into a holding engagement with a sheet part not formed as an organic sheet metal part or with a further metal washer.

16 Claims, 11 Drawing Sheets

Figure 1:
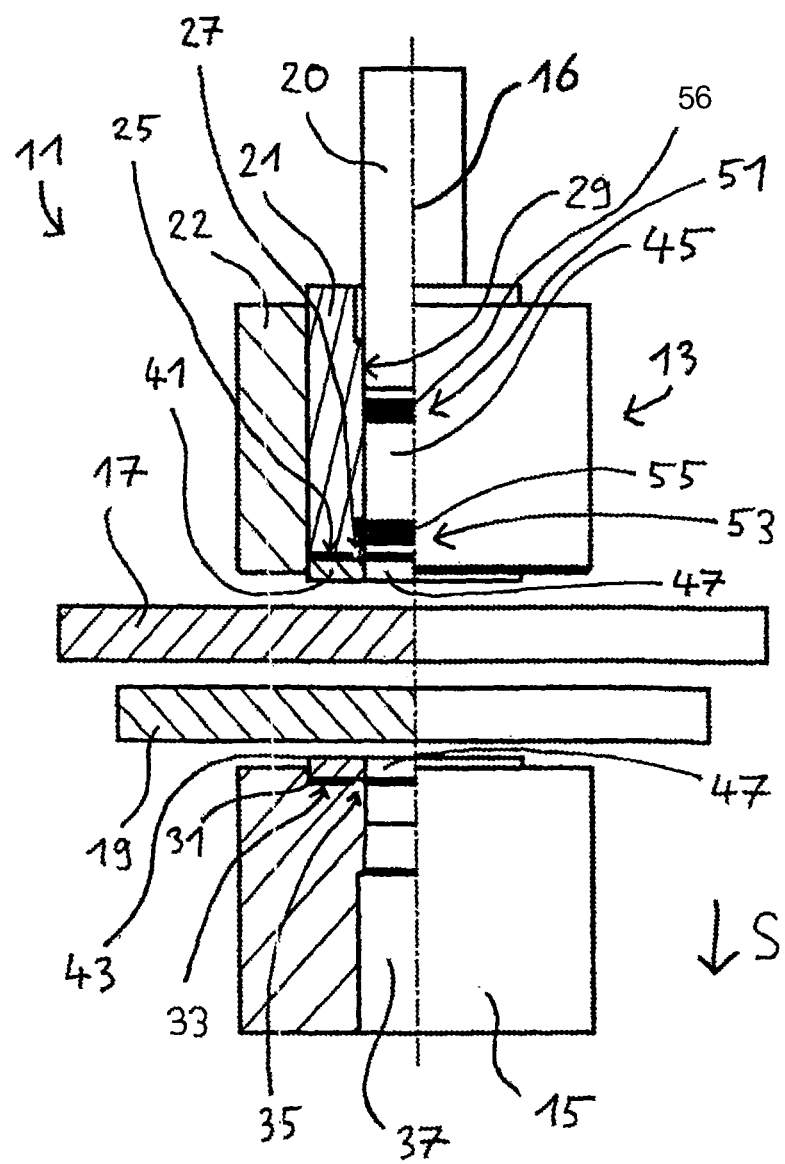

(51) Int. Cl.
*B21J 15/02* (2006.01)
*B29C 65/56* (2006.01)
*B29C 65/00* (2006.01)
*B29C 65/60* (2006.01)
*F16B 19/05* (2006.01)
*F16B 19/06* (2006.01)

(52) U.S. Cl.
CPC .......... *B29C 66/1122* (2013.01); *B29C 66/21* (2013.01); *B29C 66/41* (2013.01); *B29C 66/721* (2013.01); *B29C 66/8161* (2013.01); *B29C 66/8167* (2013.01); *B29C 66/8242* (2013.01); *B29C 66/8322* (2013.01); *F16B 5/04* (2013.01); *B29C 65/602* (2013.01); *B29C 66/7212* (2013.01); *B29C 66/7392* (2013.01); *B29C 66/7394* (2013.01); *F16B 19/05* (2013.01); *F16B 19/06* (2013.01); *Y10T 29/49948* (2015.01); *Y10T 403/4949* (2015.01)

(58) Field of Classification Search
CPC .............. B29C 66/721; B29C 66/8161; B29C 66/8167; B29C 66/8322; F16B 5/04
See application file for complete search history.

(56) References Cited

U.S. PATENT DOCUMENTS

| | | | |
|---|---|---|---|
| 9,387,557 B2 * | 7/2016 | Doo | .......................... B21J 15/025 |
| 9,555,466 B2 * | 1/2017 | Ueda | ........................ B21J 15/02 |
| 2002/0038504 A1 | 4/2002 | Engler et al. | |
| 2002/0172576 A1 | 11/2002 | Keener | |
| 2009/0304438 A1 | 12/2009 | Kolax et al. | |
| 2013/0000101 A1 * | 1/2013 | Rintelmann | ............ F16B 19/00 29/525.03 |
| 2013/0248083 A1 | 9/2013 | Takahashi et al. | |
| 2013/0340239 A1 * | 12/2013 | Ueda | ..................... B21J 15/025 29/525.06 |

FOREIGN PATENT DOCUMENTS

| | | |
|---|---|---|
| DE | 19747267 A1 | 5/1999 |
| DE | 102008005289 A1 | 7/2009 |
| DE | 102009048398 A1 | 4/2011 |
| DE | 102010000500 A1 | 8/2011 |
| DE | 102011103723 A1 | 12/2012 |
| DE | 102011114306 A1 | 3/2013 |
| DE | 102012104982 A1 | 12/2013 |
| EP | 0691900 B1 | 6/1997 |
| EP | 0890397 B1 | 3/2003 |
| EP | 2617539 A1 | 7/2013 |
| WO | 9422636 A1 | 10/1994 |
| WO | 2012113463 A1 | 8/2012 |

* cited by examiner

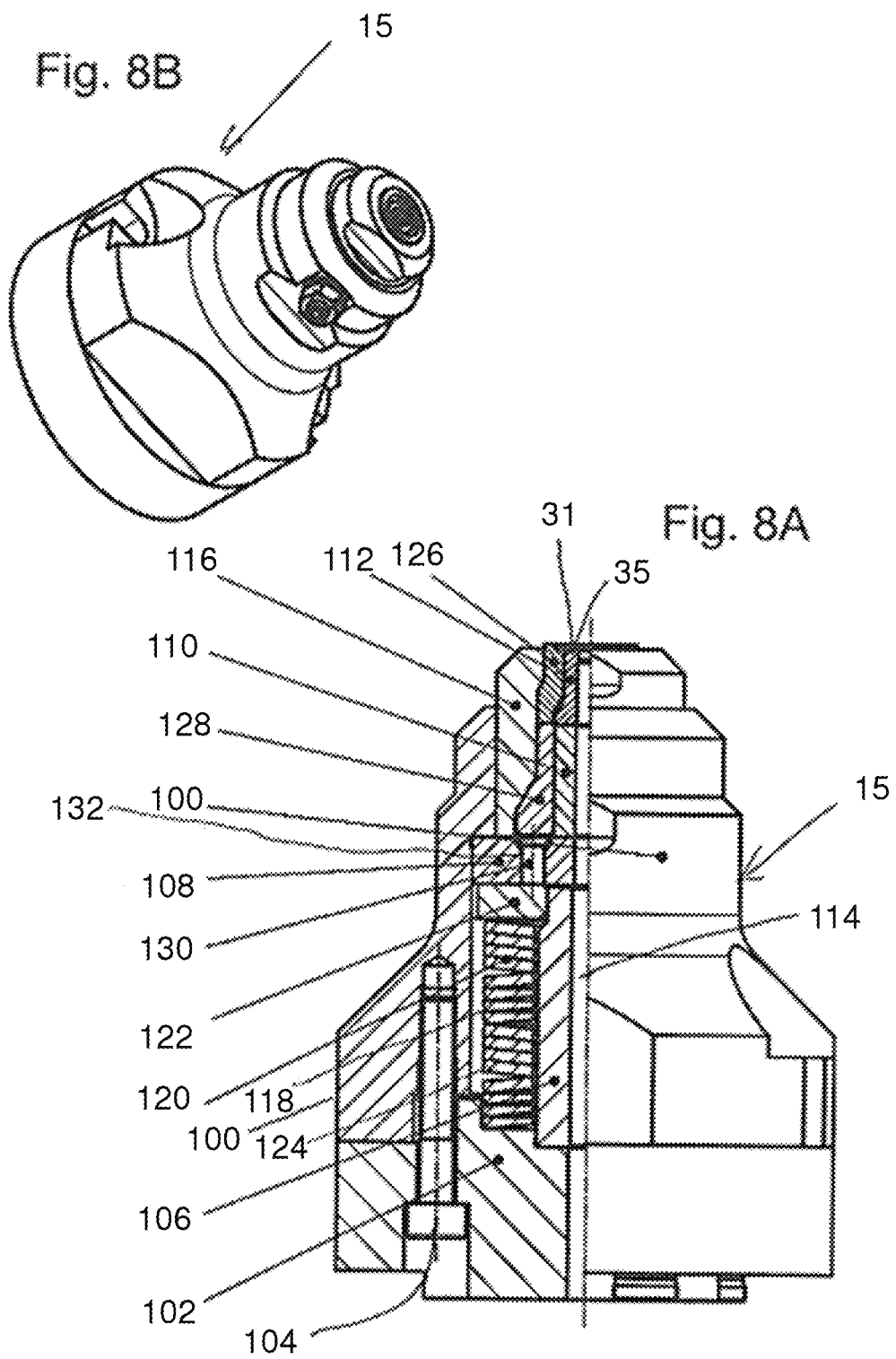

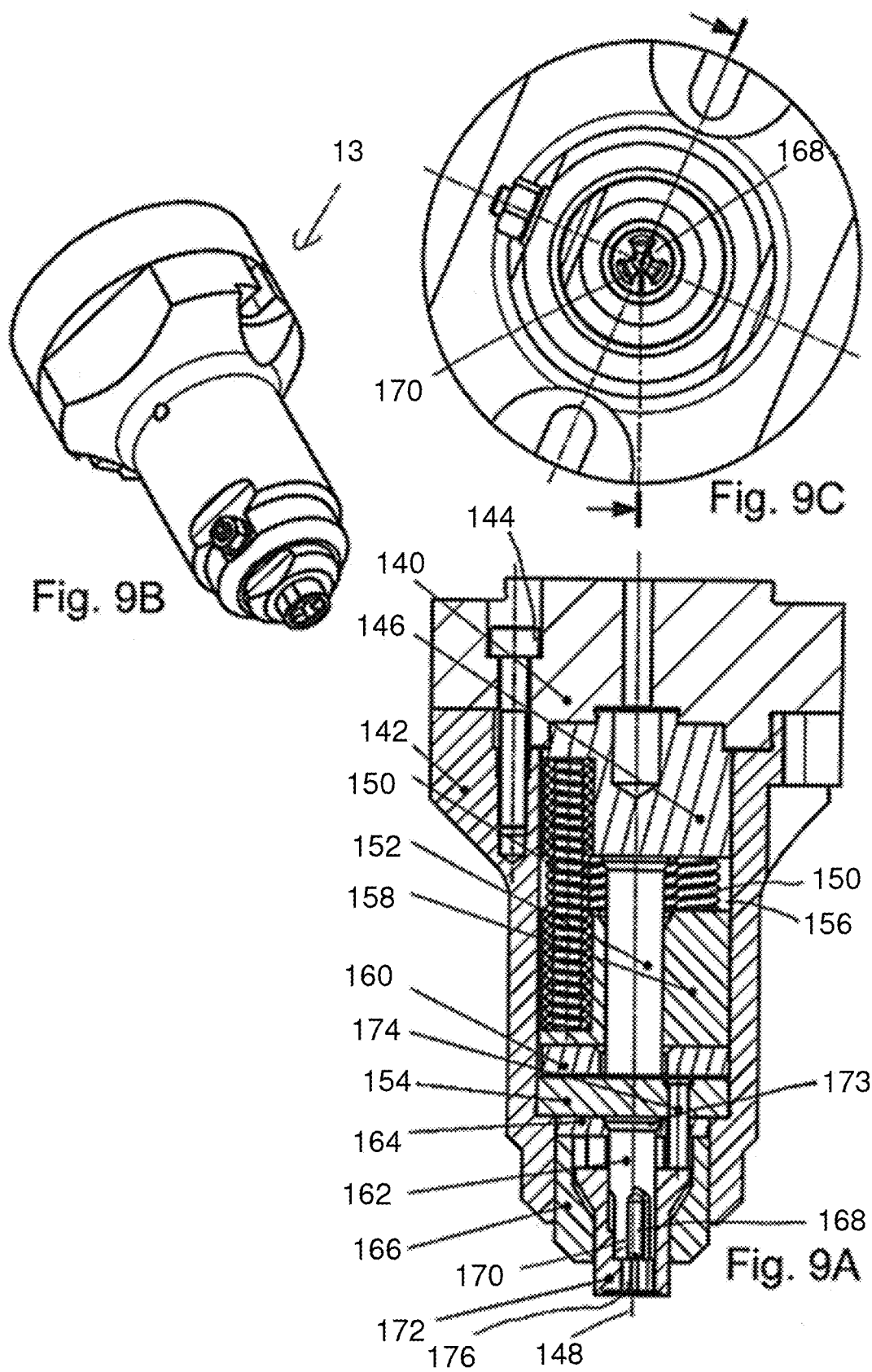

METHOD FOR THE CONNECTION OF SHEET METAL PARTS AND COMPONENT ASSEMBLY AS WELL AS SETTING HEAD AND DIE BUTTON

The present invention relates to a method for joining an upper sheet metal part and of a lower sheet metal part of which at least one is formed as an organic sheet metal part.

Components are termed organic sheet metal parts which as a result of their table-like form can be handled like sheet metals, but which consist of a non-metallic composite material such as a fiber or fabric reinforced plastic. Such composite materials generally have high strength fibers, such as, for example aramid fibers, carbon fibers or glass fibers, which are either present as relatively short filling fibers or as long filaments or in the form of a fabric fabricated from filaments embedded in a matrix material of plastic. Thermoplastic materials can indeed be used as plastic; however, for coachwork components, duroplastic plastics are normally used. In the coachwork construction and in other fields of technology organic sheet metal parts are increasingly being used as a result of their characteristics such as their lightness, their high mechanical loadability and their good deformability.

A problem in the connection of two organic sheet metal parts or of an organic sheet metal part to a metallic sheet metal part consists however in the fact that some current joining processes, such as, e.g. the self-pierced rivet process are not suitable for fiber or fabric reinforced plastics.

The requirement thus exists to enable a simple and effective joining of sheet metal parts of which at least one is an organic sheet metal part.

The solution of this object takes place by a method having the features of claim 1 and while a component assembly having the features of claim 8.

A method in accordance with the invention is carried out by means of an auxiliary joining part and at least one apertured metal washer, with the auxiliary joining part having a functional section with an undercut at one end and at the other end, a piercing section with a lateral shaft surface and a shaft recess formed therein.

In accordance with the invention the following steps are carried out:
i) the upper sheet metal part, the lower sheet metal part and the metal washer are brought into a stacked arrangement in such a way that the metal washer lies on the organic sheet metal part,
ii) the piercing section of the auxiliary joining part is used in order to pierce a slug from the stacked sheet metal part,
iii) either the functional section or the piercing section is passed through an aperture of the metal washer until the undercut or the at least one shaft recess is at least partly surrounded by washer material,
iv) an adequate pressure is exerted on the metal washer in order to drive washer material into the at least one shaft recess or into the undercut and thereby to join the auxiliary joining part to the metal washer, and
v) the other respective one of the undercut or of the shaft recess is brought into a holding engagement with a sheet metal part not formed as an organic sheet metal part or with a further metal washer, with the sheet metal part not formed as an organic sheet metal part or with the further metal washer being located at the side of the stacked arrangement remote from the first metal washer.

The auxiliary joining part is thus used in a similar manner to a so-called full pierce rivet. As a result of the metal driven into the undercut or into the shaft recess a stable connection arises between the auxiliary joining part and the metal disc. This in turn clamps the stacked arrangement together from one side. Without a metal washer the auxiliary joining part could hardly be anchored in the organic sheet metal part because fiber or fabric reinforced plastics do not generally have the required flow characteristics. The invention thus relates in particular to the recognition that the problems which arise during the joining of organic sheet metal parts can be overcome by suitable use of an apertured metal washer and of an auxiliary joining part with an undercut and shaft recess.

Further developments of the invention are set forth in the dependent claims, in the description and also in the accompanying drawings.

The same shaping is preferably selected for the undercut as for the shaft recess. This is to say the functional section is formed in shaft-like manner, as is the piercing section and likewise has at least one shaft recess. The auxiliary joining part then has a particularly simple shape. In particular a symmetrical design at both ends of the auxiliary joining part can be considered. Basically the functional section can however also have a different type of undercut, for example a single contact shoulder.

An embodiment of the invention provides that the metal washer is positioned at the lower side of the lower sheet metal part formed as the organic sheet metal part by means of a die button which has a mount for the metal washer and a passage for leading away the piercing slug. The die button can be part of a press or piercing tool in which the method of the invention is carried out. The mount can for example be of trough-like design.

A special design provides that in the step (iv) the metal washer is deformed in the region of the rim of the aperture by means of at least one projection, in particular a ring-like projection, provided in the mount of the die button. The projection, which can in particular made relatively narrow serves for a high pressing pressure at the point at which the washer material should be driven into the shaft recess.

A further embodiment of the invention provides that the metal washer is positioned by means of the setting head at the upper side of the upper sheet metal part formed as an organic sheet metal part, with the auxiliary joining part being passed by means of a plunger of the setting head acting on the functional section through the aperture of the metal washer. Having regard to this embodiment, the joining method can also be carried out in simple manner in a familiar pressing or punching tool. The metal washer can be held at the workpiece surface by an outer plunger surrounding the plunger. Furthermore, the setting head can have a hold-down member arranged radially outside of the plunger to press the organic sheet metal part against the adjacent layer of the stack.

Furthermore, provision can be made that in the step (iv) the metal washer is deformed in the region of the rim of the aperture by means of at least one projection, in particular a ring-like projection, provided at the underside of an outer plunger of the setting head acting on the metal washer. In similar manner to that described above in relation to the projection arranged in the mount of the die button an effective driving of washer material into the undercut can be brought about.

A further embodiment of the invention provides that both the upper sheet metal part and also the lower sheet metal part are executed as organic sheet metal parts, with a lower metal washer being positioned by means of a die button at the underside of the lower organic sheet metal part and an upper metal washer being positioned at the upper side of the upper organic sheet metal part and being aligned with the lower metal washer by means of a setting head. This enables an effective connection of two organic sheet metal parts, wherein one and the same press or piercing tool can be used in an advantageous manner for the connection of the auxiliary joining part both to the upper metal washer and also to the lower metal washer.

The invention also relates to a component assembly comprising a stacked arrangement of an upper sheet metal part and of a lower sheet metal part of which at least one is formed as an organic sheet metal part.

In accordance with the invention the stacked arrangement includes an auxiliary joining part and at least one apertured metal washer, with the auxiliary joining part having at one end a functional section of an undercut and also at the other end having a piercing section with a lateral shaft surface and the shaft recess formed therein, with the metal washer contacting the surface of the organic sheet metal part, with the functional section or the piercing section extending through an aperture of the metal washer and with washer material being driven into the undercut or into at least one shaft recess, whereby the auxiliary joining part is joined to the metal washer and wherein the respective other one of the undercut or of the shaft recess is in a holding engagement with a sheet metal part not formed as an organic sheet metal part or with a further metal washer, with the sheet metal part not formed as an organic sheet metal part or with the further metal washer being located at the side of the stacked arrangement remote from the first metal washer. A stacked arrangement of this kind can also include one or two intermediate layers, which are located between the upper sheet metal part and the lower sheet metal part. Such intermediate layers can in particular themselves be formed as sheet metal parts—be it as metal sheet metal parts or as organic sheet metal parts.

The at least one shaft recess can be formed as a circumferential groove which makes cost-favorable manufacture possible.

Alternatively, the at least one shaft recess can be formed as a thread. It is indeed possible to realize the auxiliary joining part as a cylinder with a continuous thread.

A plurality of shaft recesses in particular a plurality of parallel circumferential grooves can also be provided at the shaft surface of the piercing section. An arrangement of a plurality of parallel grooves serves for increased joining strength. If required, complexly shaped shaft recesses can also be provided, for example also in the form of notches which include for example features providing security against rotation or the like.

The undercut preferably has the same shape as the shaft recess. That is to say the functional section is made in a shaft-like manner like the piercing section and likewise has a shaft recess. The auxiliary joining part can then have a particularly simple shaping. In particular, a symmetrical design of the two ends of the auxiliary joining part can be considered. Fundamentally, the functional section could however also have a different type of undercut, for example a single contact shoulder.

The organic sheet metal part preferably consists of a composite material, in particular of a fiber reinforced duroplastic material or a fiber reinforced thermoplastic material. The fibers provided for the reinforcement can for example—without restriction—be glass, carbon fibers and/or aramid fibers and can if required be present as a fabric or as a knitted material.

Further preferred embodiments of the method, of the setting head as used, of the component assembly and of the auxiliary joining element can be found in the further description, in the drawings and also in the patent claims.

One embodiment of the invention provides that the lower sheet metal part is formed as an organic sheet metal part and the metal washer is arranged at the lower side of the lower sheet metal part.

In accordance with an alternative embodiment the upper sheet metal part is formed as an organic sheet metal part and the metal washer is arranged at the upper side of the upper sheet metal part.

Both the upper sheet metal part and also the lower sheet metal part can be executed as organic sheet metal parts, with the lower metal washer contacting the lower side of the lower organic sheet metal part, an upper metal washer contacting the upper side of the upper organic sheet metal part and being aligned with the lower metal washer and with the auxiliary joining part passing through the apertures of the two metal washers.

The invention will now be explained by way of example and with reference to the drawings.

Figure 2:
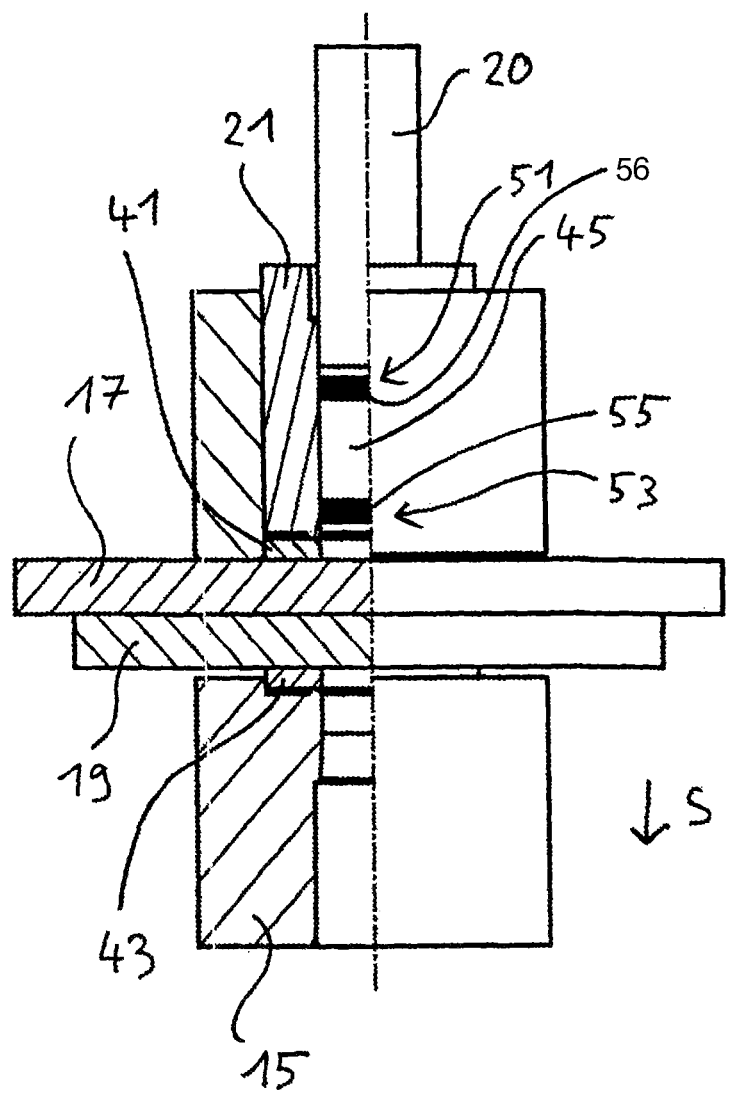
Figure 3:
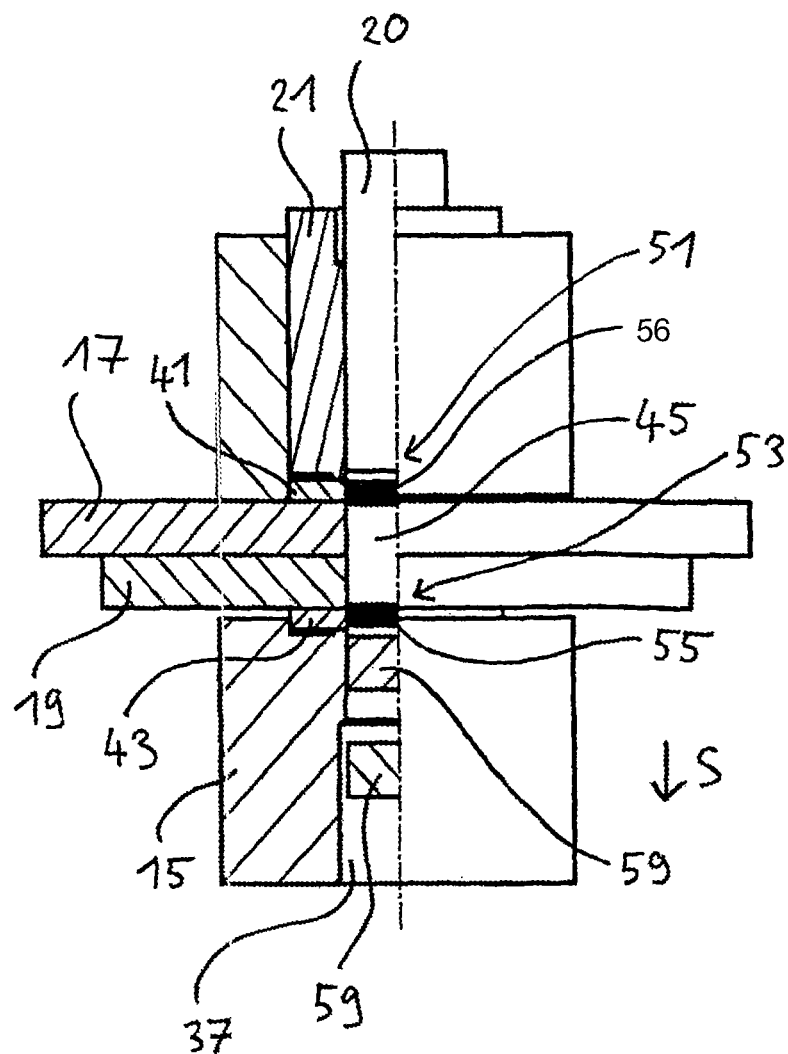
Figure 4:
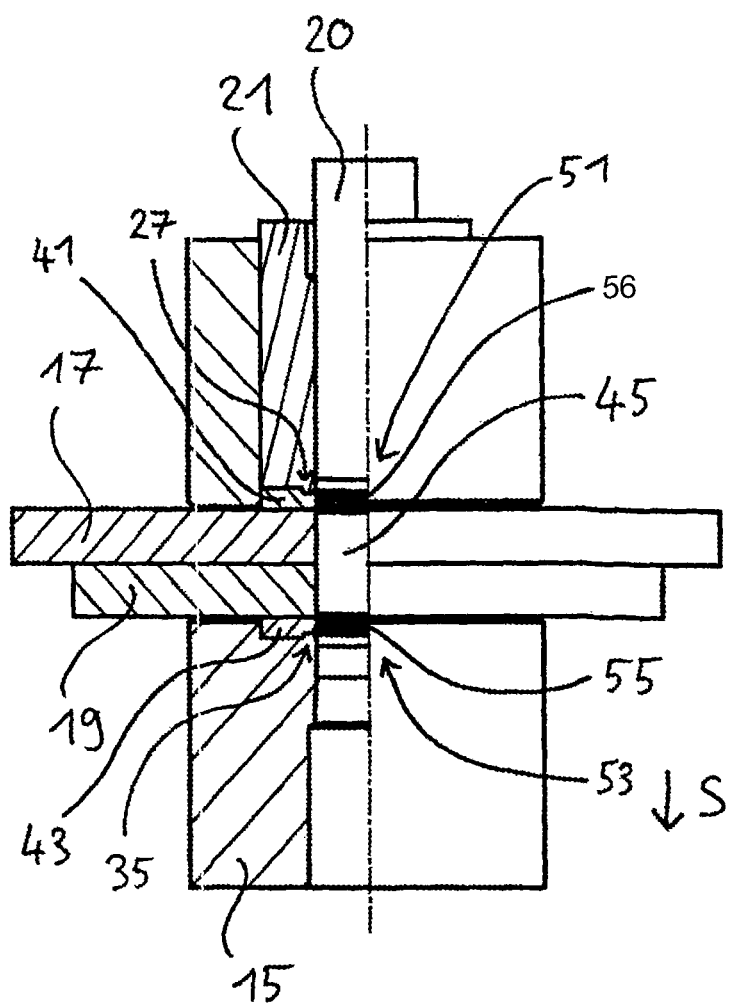
Figure 5:
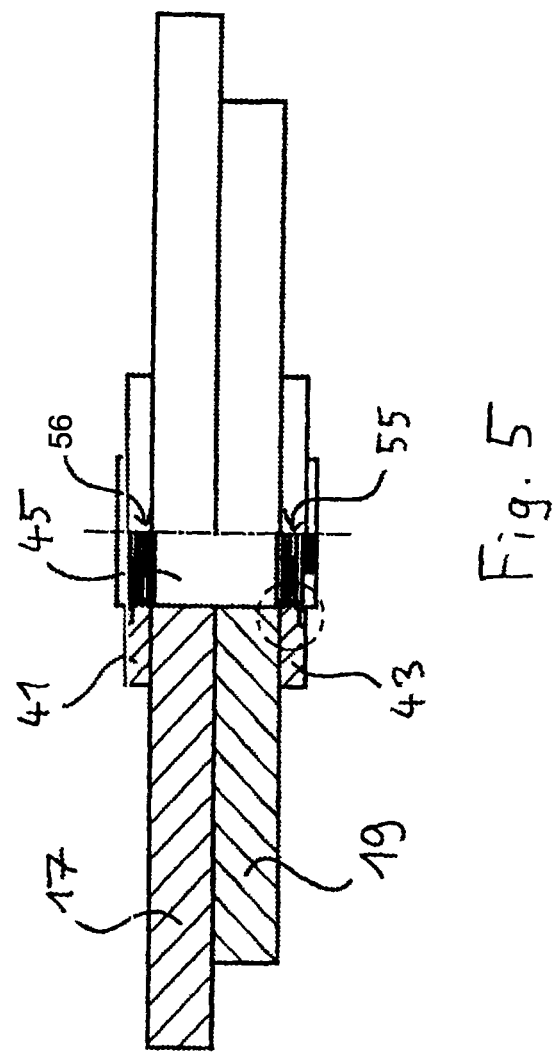
Figure 6:
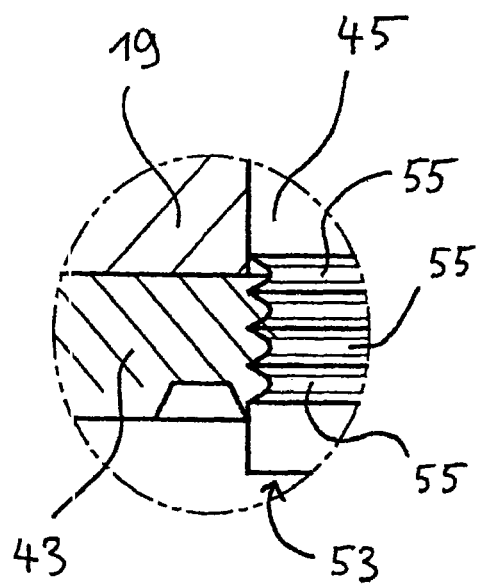
Figure 7:
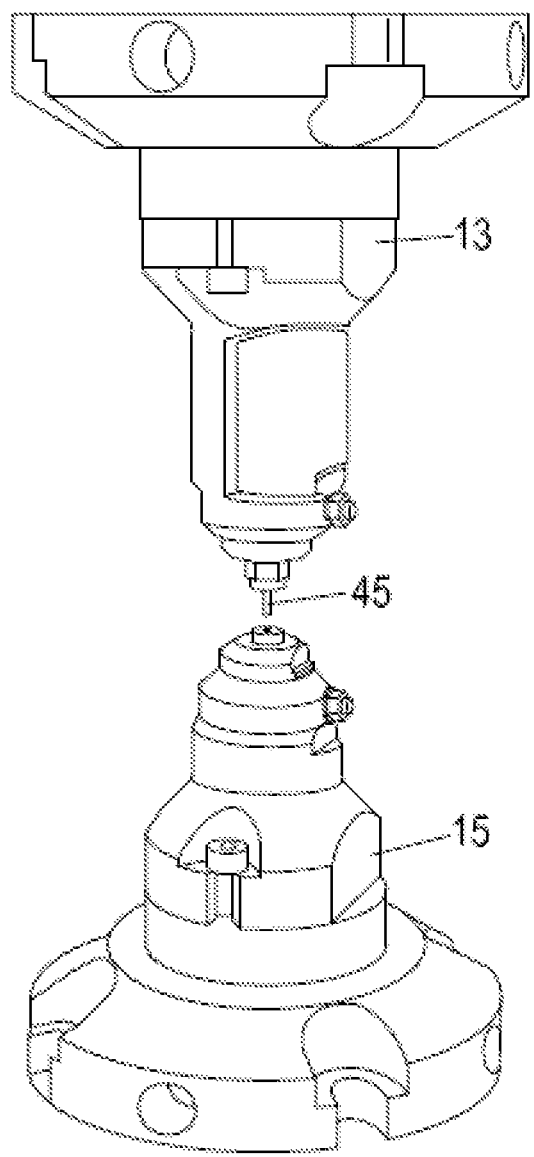
Figure 9D:
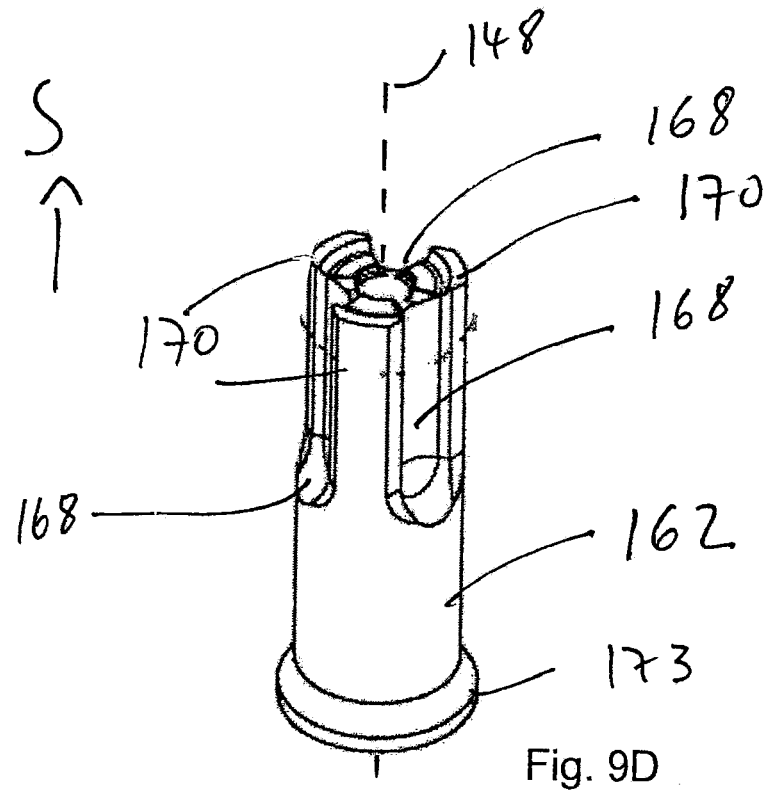
Figure 9E:
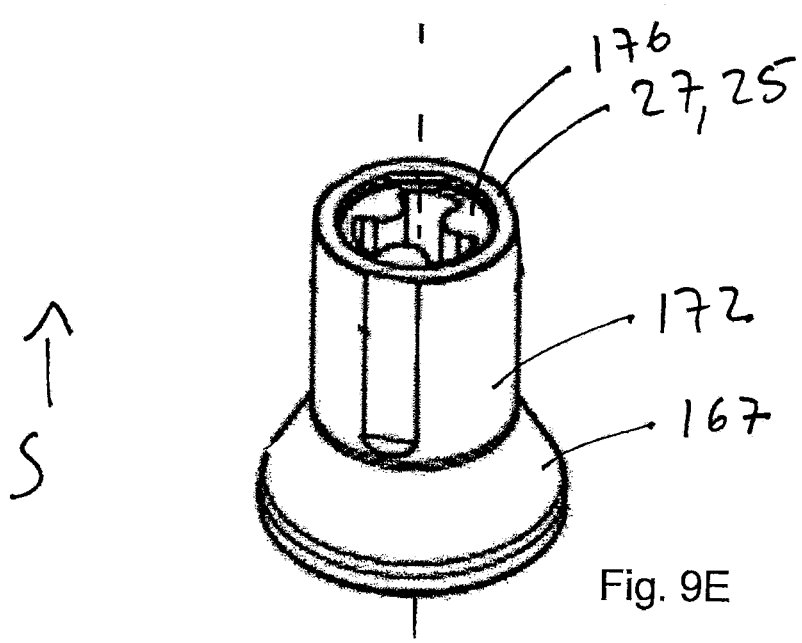
Figure 10A:
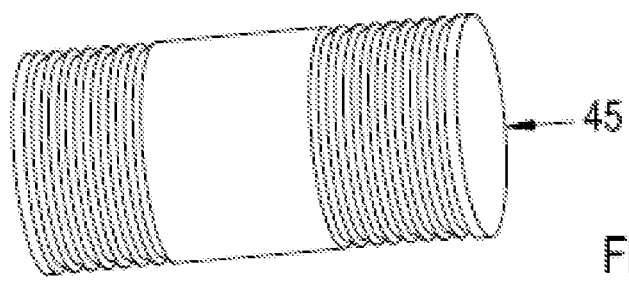
Figure 10B:
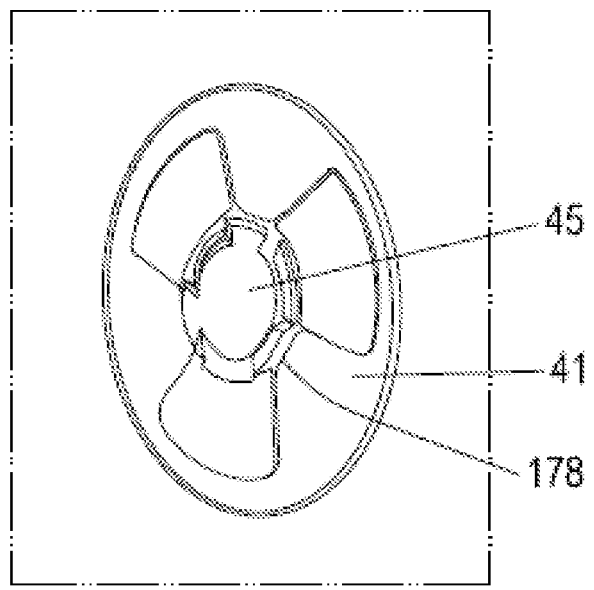

FIG. 1 shows a piercing tool which is used for the joining of two sheet metal parts in accordance with the invention, in an open position at the start of the joining process, FIG. 2 shows the same tool as FIG. 1 in a second phase of the joining process, in which the tool has been closed to the extent that the sheet metal parts are pressed against one another, FIG. 3 shows a further phase of the joining process in which the auxiliary joining part is just being punched through the sheet metal parts, FIG. 4 shows the last phase in the joining process in which the sheet metal parts are fully joined to one another by means of the auxiliary joining part in the fully closed state of the tool, FIG. 5 shows a component assembly in accordance with the invention which can be obtained by the method illustrated in FIGS. 1-4, FIG. 6 is an enlarged part section of FIG. 5 which shows the joining position between an auxiliary joining part and a metal washer of the component assembly in more detail, FIG. 7 shows a schematic representation of an alternative tool for the carrying out of an alternative method in accordance with the invention for the joining of two sheet metal parts to one another, of which at least one is formed as an organic sheet metal part, FIG. 8A a representation partly sectioned in the longitudinal direction of the die button shown at the bottom in FIG. 7, FIG. 8B shows a perspective illustration of the die button of FIG. 8A, FIG. 9A shows a representation section in the longitudinal direction of the setting head of FIG. 7 illustrated at the top, with the section plane being placed in accordance with the arrows in the end view of FIG. 9C, FIG. 9B shows a perspective representation of the setting head of FIG. 9A, FIG. 9C shows an end view of the setting head of FIG. 9A seen from below, FIG. 9D shows a view of a pressure plunger of the setting head of FIG. 9A, FIG. 9E shows a view of the nose piece of the setting head of FIG. 9A, FIG. 10A shows a photographic image of an auxiliary joining part in accordance with the invention, FIG. 10B shows a representation of the one end of the auxiliary joining part of FIG. 10A after it has been embossed in order to achieve a form-fitted connection to the like-wise illustrated metal washer which represents the result of the use of the setting head of FIGS. 9A to 9E, and FIG. 10C shows a representation of the other end of the auxiliary joining part of FIG. 10A after it has been joined to the likewise illustrated metal washer by deformation of the metal material of the metal washer in order to achieve a form-fitted connection with the metal washer, which represents the results of the use of the die button in accordance with FIGS. 8A and 8B.

The piercing tool 11 which is only partly shown in FIG. 1 includes a setting head 13 and a die button 15 between which two sheet metal parts are arranged which are to be connected to one another, namely an upper sheet metal part 17 and a lower sheet metal part 19. In the illustrated embodiment both sheet metal parts 17, 19 are executed as organic sheet metal parts, that is to say these consist of a non-metallic composite material, such as, a fiber reinforced plastic. It should be pointed out that one or more intermediate layers can be arranged between the sheet metal parts 17, 19, for example further organic sheet metal parts or metallic sheet metal parts.

As illustrated the piercing or setting head 13 has an inner plunger 20, an outer plunger 21 surrounding it and also a hold-down member 22 surrounding the outer plunger 21 which can be moved relative to one another with respect to a piercing direction S. A narrow projection, here ring-like plunger projection 27, is formed at an end face 25 of the outer plunger 22 facing the setting direction S, with the projection being arranged adjacent to an inner spacer 29 defined by the outer plunger 21.

The die button 15 has at its upper side a trough-like mount 31 with a narrow die projection 35, here a ring-like die projection projecting from its base 33. Furthermore, the die button 15 has a central passage 37 which is bordered by the die projection 35.

The joining of the two sheet metal parts 17, 19 takes place with the aid of two metal washers, namely an upper metal washer 41 and a lower metal washer 43 and also of pierced rivet-like auxiliary joining part 45. The metal washers 41, 43 each have an aperture 47, the diameter of which corresponds substantially to the outer diameter of the shaft part of the auxiliary joining part 45. In the starting configuration of FIG. 2 the upper metal washer 41 lies against the upper side of the upper sheet metal part 17 and is acted on by the outer plunger 21. The lower metal washer 43 is located in a mount 31 of the die button 15 and is held in contact by the die button at the lower side of the lower sheet metal part 19. The auxiliary joining part 45 has a functional section 51 at one end and has a piercing section 53 at the other end. A respective arrangement of a plurality of circumferential shaft grooves 55 extending parallel to one another is provided both in the region of the functional section 51 and also in the region of the piercing section 53. The groove(s) in the region of the functional section 51 may be referred to herein as an undercut and referenced with numeral 56 in FIGS. 1-5. The auxiliary joining part 45 is preferably manufactured of a metal suitable for the piercing of sheet metals.

A piercing process shown in FIG. 3 is introduced by the lowering of the inner plunger 20 relative to the die button 15. The auxiliary joining part 45 is pressed by the inner plunger 20 through the upper sheet metal part 17 and the lower sheet metal part 19, with piercing slugs 59 being punched out and being led away through the passage 37 of the die button 15. During the piercing the auxiliary joining part 45 is passed through the apertures 47 of the sheet metal parts 17, 19. At the end of the piercing process, the shaft grooves 55 of the functional section 51 are located in the region of the upper metal washer 41 while the shaft grooves 55 of the piercing section 53 are located in the region of the lower metal washer 43.

Thereafter, the outer plunger 21 and the die button 15 are moved towards one another with respect to the piercing direction S, with the plunger projection 27 engaging into the upper metal washer 41 and deforming this locally (FIG. 4). In the course of this deformation metallic material is driven into or deformed into the closely disposed shaft grooves 55 so that ultimately a stable joint connection results between the upper metal washer 41 and the auxiliary joining part 45 (FIG. 6). In the same way the die button projection 35 engages into the lower metal washer 43 and brings about a local deformation, wherein metallic material is in turn driven into the closely disposed shaft grooves 55. Thus, a stable joint connection results also between the lower metal washer 43 and the auxiliary joining part 45.

As a result a component assembly 60 is present as shown in FIG. 5 which includes two organic sheet metal parts 17, 19 which are firmly joined to one another. The arrangement of the two metal washers 41, 43 and of the auxiliary joining part 45 passed through the component stack clamps the organic sheet metal part 17, 19 reliably against one another. It is thus not necessary to anchor the auxiliary joining part 45 or further connection elements in the material of the organic sheet metal parts 17, 19. Should one of the sheet metal parts 17, 19 be a metallic sheet metal part, then one of the two metal washers 41, 43 can be dispensed with. The auxiliary joining part 45 can then only be guided during the piercing in such a way that either the shaft grooves 55 of the functional element 51 or the shaft grooves 55 of the piercing section 53 are located in the upper sheet metal part 17 or in the lower sheet metal part 19 respectively. In this case, pressure can be exerted on the sheet metal parts 17, 19 in the normal manner in order to drive metallic workpiece material into the shaft grooves 55.

On the whole the invention enables a reliable connection of sheet metal parts which at least forms organic sheet metal parts.

One is concerned here, as is customary for the attachment of fastener elements, with a setting head 13 which is arranged at the upper tool of a press or at an intermediate plate of the press, whereas the tool which receives the die button 15 is the intermediate plate of the press or the lower tool of the press. An inverse arrangement would also be possible in which the setting head 13 is arranged at the lower tool of the press or at an intermediate plate of the press while the die button 15 is then located at the intermediate plate or at the upper tool of the press.

It is in no way essential to use a press for the attachment of the fastener element to the workpiece. By way of example a robot, for example in accordance with the European patent 0 691 900 can be used in a known manner, with the die button 15 and the setting head then being carried by the robot. A punching tool or other tools can also be used for the attachment of the functional elements arrangement to the sheet metal part, for example a tool in accordance with one of the following protective rights: DE-PS 197 47 267, EP 0 890 397 or DE-PS 197 01 088.

It is indeed generally customary to attach fastener elements 45 at a workpiece with the central longitudinal axis 16 being vertically arranged, an orientation of this kind is however in no way essential. Instead of this the central longitudinal axis 16 can have any desired orientation in space. Accordingly, when geometric terms such as vertical or up or down or above or below are used in this application then this is to be understood in such way that the designations are only to be typical to the orientation of the corresponding Figure and are in no way to be interpreted in restrictive manner.

As can for example be seen from the short description of FIG. 2 and the subsequent description of this FIG. 2 and also of FIG. 3 the tool is closed to such an extent that the sheet metal parts are pressed against one another. This is an important condition to ensure that the auxiliary joining part successfully pierces the sheet metal parts or the organic sheet metal parts and generates a clean aperture of the organic sheet metal part or parts without fraying out of the latter and also a clean piercing slug.

In the following the embodiments in accordance with FIGS. 7 to 10C will be described. In these Figures the same reference numerals will be used for parts as were used in the previous Figures, as far as the corresponding parts in FIGS. 7 and 10C have the same function. Parts which are additionally used or which have a significantly different function are used with new reference numerals starting with the characteristic number 100. It will be understood that when using the previous reference numerals in FIGS. 7 to 10C the previous description applies unless something is stated to the contrary.

FIG. 7 shows the die button 15 and the setting head the central longitudinal axes of which coincide. In this connection the die button 15 is formed for reception in the lower tool of the press or in an intermediate plate of the press while the setting head is designed for reception in the intermediate plate of the press or in the upper tool of the press. An inverse arrangement is also possible, i.e. the die button can also be mounted facing downwardly in the upper tool of the press or in an intermediate plate of the press, while the setting head is located facing upwardly in the intermediate plate of the press or in the lower tool of the press respectively. It is however not essential to use a press with an intermediate plate. Moreover, other attachment devices for joining parts can also be considered, such as, for example a robot or power-operated tongues which move the setting head to the die button or vice versa.

Figure 10C:
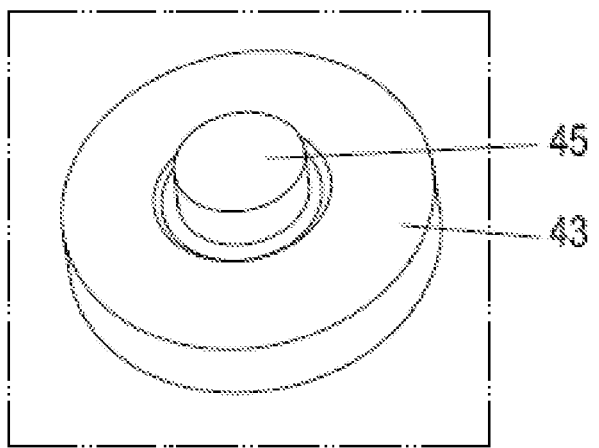

No components of the press or of the sheet metal parts can be seen in FIG. 7 and the auxiliary joining part which is shown on its own in FIGS. 10A to 10C simply extends out of the setting head in an exaggerated manner for the sake of representation.

The FIGS. 8A and 8B now show the details of a practical embodiment of the die button 15 which can also be used in a schematic representation of the embodiment of FIGS. 1 to 6.

As can in particular be seen from FIG. 8A the die button 15 has a two-part housing 100, 102 with the lower part 102 being secured by bolts 104 to the upper housing part 100. Within the housing 100, 102 there is a fixed cylinder 106, a fixed apertured disc 108 which is supported in the radially inner region by the cylinder 106, a fixed spacer cylinder 110 which is supported by the apertured disc 108 and the cylinder 106 and also a fixed inner cylinder 112 which is equipped with a ring projection 35 (or the die button projection). The components 102, 106, 108, 110 and 112 all have a central opening which jointly bound a passage 114 through which the piercing slugs 59 that are produced can be led away or dispensed of. Furthermore, the die button 15 has a fixed outer cylinder 116 which is supported by the apertured disc 108 and indeed by the outer radial region of the apertured disc 108.

Between the outer side of the fixed cylinder 106 and the radially inner side of the upper housing part 100 and also beneath the apertured disc 108 there is located a cylindrical hollow space 118 in which a support ring 122 supported by means of a spring pack 120 and restrictedly movable in the axial direction of the die button is arranged. In this example the spring pack consists of a plurality of plate springs 124 which are placed on one another and which are centered by the spacer cylinder 106. The die button 15 furthermore includes an axially movable upper intermediate cylinder 126 and an axially movable lower intermediate cylinder 128. Between the lower side of the lower intermediate cylinder 128 and the axially restricted movable support ring 122 there are a plurality of axially aligned pressure pins 130 which are located in a circular arrangement and which are guided through individual axially parallel bores 132 in the apertured disc, with these axially parallel bores being located in a circular arrangement around the central hole of the apertured disc 108.

The manner of operation of the die button can be understood as follows:

A metal washer (not shown here) is first placed into the mount 31 defined by the upper intermediate cylinder. The sheet metal parts which are not shown here (17 and 19 in the previous FIGS. 1 to 6), for example two organic sheet metal parts or one organic sheet metal part and one metallic sheet metal part are placed above one another on the upper side of the metal washer. During the closing movement of the press (not shown) the sheet metal parts are pressed together via the setting head 13 (FIG. 7) and are pressed against the surface of the metal washer provided in the mount and not shown here.

In the pressed together state of the sheet metal parts and of the metal washer the sheet metal parts are pierced by means of the auxiliary joining part 45 (FIG. 7) driven by the setting head and the lower end of the auxiliary joining part 45 (FIG. 7) is introduced into the aperture of the metal washer. The piercing slug, i.e. the punched out material falls into the central passage 114 and can be disposed of through the central passage 114, optionally with the aid of an air blast. During this working step the force of the spring pack 120 is sufficient and dimensioned in order to prevent a movement of the upper intermediate cylinder 126 by means of the support ring 122, the pressure pins 130 and the lower intermediate cylinder 128. As soon as the press is about to close completely, a considerably larger force is exerted onto the upper end face of the upper intermediate cylinder 126 and this deviates backwardly in the axial direction (downwardly in FIG. 8A) with this deviating movement bringing about a compression of the spring pack 120 via the lower intermediate cylinder 128, the pressure pins 130 and the support ring 122.

As a result of this deviation movement and of the forces which arise in this way on closing the press, the upper end face of the upper fixed inner cylinder 112, which forms the die button projection 35, is pressed into the material of the apertured metal washer and deforms this material in such a way that it flows into the undercut of the auxiliary joining part 45 and joins the auxiliary joining part to the apertured metal washer and connects the auxiliary joining part to the apertured metal washer in form-fitted manner.

In this example the auxiliary joining part is designed as shown in FIG. 10A and the form-fitted connection of the corresponding end of the auxiliary joining part 45 with the metal washer is formed as shown in FIG. 10B. The end face of the auxiliary joining part projects fractionally beyond the metal washer 43 and it can be seen that the metal washer has been indented in ring-like manner around the projecting end of the auxiliary joining part.

The manner of operation of the setting head 13 of FIG. 7 differs from that of the setting head 13 of FIGS. 1 to 4 and indeed principally in the fact that instead of driving material of the metal washer 41 into an undercut of the auxiliary joining part the corresponding adjacent end of the metal washer 41 is embossed and thus joined to the metal washer 41 or to the upper sheet metal part. For the setting head of FIGS. 9A-9E an auxiliary joining part 45 can be used in accordance with FIG. 10A, with the result of the embossing of the auxiliary joining part being shown in FIG. 10B and being explained later in more detail. In this connection it should however be noted that it is in no way necessary to use an auxiliary joining art 45 in accordance with FIG. 10A with undercuts at both ends, but rather the auxiliary joining part can have a different design, for example that of a circular cylinder without any features of shape which differ from the jacket surface of a right cylinder.

In this example an auxiliary joining part 45 is used with undercuts in the form of threads at both ends, as an undercut is necessary in order to sensibly use the die button 15 in accordance with FIGS. 8A and 8B and the provision of thread cylinders at both ends ensures that the auxiliary joining part 45 can never be inadvertently used the wrong way round because it is symmetrically designed.

The design and the manner of operation of the setting head 13 of FIGS. 9A to 9E will now be described in detail.

The setting 13 is intended for incorporation into an upper tool of a press or into an intermediate plate of the press or into the lower tool of the press in an arrangement as is described above. The setting head 13 can also be actuated by a robot or by power-operated tongues as is likewise described above.

The setting head consists of two main components in the form of an upper housing part 140 and a lower housing part 142 which is secured by means of bolts 144 to the upper part 140.

A spring abutment 146 is located coaxially within the lower housing part and serves as a support for the upper ends of a plurality of axially parallel coil spring elements 150 arranged around the central longitudinal axis 148 of the setting head. The spring abutment 146 also serves to support the bolt 152 as well as the massive disc 154. The spring abutment 146, the bolt 152 and the massive disc 154 are firmly arranged in the housing. The bolt 152 serves as a guide for a sleeve 158 which is axially displaceable in a cylinder space 156 of the lower housing part 142 against which the coil springs 150 are braced. In this connection the individual coil springs 150 extend in axially parallel bores 160 of the displaceable sleeve 158 and are also positioned by these bores 160 in the housing 102, 104 of the setting head 13.

Below the axially displaceable sleeve there is located an aperture disc or a ring 160 with a central aperture of which the diameter is somewhat larger than that of the bolt 152 which has an outer diameter which is somewhat smaller than the diameter of the hollow space 156. The axially displaceable aperture disc 160 is thus biased in an open position of the press or in a corresponding position of the robot or tongues (all not shown here) downwardly and in the direction of the fixed disc 154 by the coil springs 150 via the displaceable sleeve 158.

Beneath the fixed solid disc 154 there is likewise located a fixed pressure plunger 162 (see FIG. 9D) which is fixedly attached to the massive disc 154 by means of an apertured ring 164 and a sleeve 166 which can be screwed into the lower housing part 152 and which firmly holds the ring 164. The lower end of the pressure plunger has a cylindrical jacket surface, but in the example shown here in FIG. 9D also has three longitudinal slots 168 so that three plunger tongues 170 remain (the number of the longitudinal slots 168 and of the plunger tongues is not critical, three is however preferred).

FIG. 9D shows a detailed view of the pressure plunger 162 of FIG. 9A. The pressure plunger having a substantially cylindrical outer shape with three plunger tongues 172 at an end thereof and a base section 173 at the other end. The base section 173 has a slightly conical surface which is adapted and arranged in such a way that it cooperates with the apertured ring 164 to fix it to the massive disc 154 of the setting head 13 (see FIG. 9A).

The pressure plunger 162, i.e. its plunger tongues 170 are guided in a hollow space of a nose piece 172 (see FIG. 9E) which is axially displaceable on the pressure plunger 162, with the lower end of the axially displaceable nose piece 172 having a shape at the inner side which is complementary to the plunger tongues 170 (as is evident from FIG. 9C) and indeed over an axial length which corresponds approximately to the axial movement capability of the nose piece 172. The upper end of the axially displaceable nose piece 172 is conically formed at its outer side so that it is secured by the conically converging end of the sleeve 166 at the inner side against loss from the setting head 13. Above the inner side of the conically converging end of the sleeve 166 there is located a cylindrical space which is large enough in order to permit the axial movability of the nose piece 172.

Between the axially displaceable nose piece 172 and the movable aperture disc are located axially parallel pressure pins 174 arranged in a circle, which extend through correspondingly arranged bores of the solid disc 154 in order to engage at their lower ends at the nose piece and to contact the underside of the axially displaceable ring 160 at their upper ends.

In an open position of the press or of the robot that is used or of the tongues that are used the setting head 13 is in the illustrated position in which the compression coil springs 150 are pressed downwardly via the axially displaceable sleeve 158, the axially displaceable ring 160 and the pressure pins 170 press the nose piece 172 downwardly. The front (lower) end of the nose piece 172 thus projects beyond the lower free end face of the plunger tongues 170. The one end of the auxiliary joining part is inserted by hand into the correspondingly dimensioned mount 176 at the lower end of the displaceable nose piece and can be held there by a small quantity of grease or magnetically or by a spring ring (all not shown).

FIG. 9E shows a detailed view of the nose piece 172 of FIG. 9A, one can clearly see the conical outer surface 167 adapted to cooperate with the sleeve 166 (see FIG. 9A) and the mount 176 adjacent to the end face 25 having the plunger projection 27. The mount 176 is clearly configured at its center to receive the three plunger tongues 170 of the pressure plunger 162.

One can see, like from FIG. 9A, that the lower end face of the nose piece has the mount 176 (here in the shape of a ring recess) for a metal washer such as 41 in FIG. 1. The metal washer 41 can likewise be held by means of a small quantity of grease, magnetically or by means of spring elements such as polyurethane cushions which engage outwardly at the metal washer. The plunger tongues 170 are dimensioned in such a way that they emboss the end face of the corresponding end of the auxiliary joining part 45 at three outwardly displaced positions, as can be seen from the impressions 178 of FIG. 10B.

The embossing takes place during the corresponding movement of the robot or of the tongues (all not shown). During the corresponding closing movement the lower end of the nose piece 172 or the lower side of a metal washer 41 (not shown) held therein presses against the upper side of the upper sheet metal part 17 and presses the two sheet metal parts 17 and 19 together and in addition presses any metal washers such as 41, 43 which are provided against the sheet metal parts. I.e. the stack of the sheet metal parts and metal washer(s) is pressed together. The force which is exerted from the coil springs 150 via the displaceable sleeve 158, the ring 160 and the pressure pins 174 on the nose piece 172 is sufficient for this in order to avoid an upwardly directed deviation movement of the nose piece 172. The force which acts on a nose piece 172 from below first arises in the last phase of the closing of the press or of a corresponding movement of the robot or of the tongues to such an extent that the nose piece deviates upwardly and the pressure plunger 162 drives the auxiliary joining part 45 through the sheet metal parts and pierces these and the plunger tongues 170 subsequently emboss the upper free end of the auxiliary joining part.

One notes from this FIG. 10B that the free end of the auxiliary joining pin 45 is pressed in at three positions angularly displaced around the central longitudinal axis and thus overlaps the upper side of the corresponding metal washer at three positions. The end of the auxiliary joining part projects fractionally beyond the metal washer 41. One can see from FIG. 10B that the free ends of the plunger tongues 170 are impressed at the same angular position into the upper surface of the metal washer 41. Through the embossing of the free end of the auxiliary joining pin 45 the auxiliary joining pin is joined in form-fitted manner to the metal washer 41. This can also be associated with a local deformation of the metal washer 41.

It will be understood that the provision of a thread cylinder at the corresponding end of the auxiliary joining part 45 is not disadvantageous even though it is not necessary. After the connection of the sheet metal parts the nose piece 172 is pressed back into the starting position of FIG. 9A by the compression coil springs 150 through an opening of the press or a corresponding movement of the robot or of a power-operated tongue and the plate springs 124 of FIG. 8A guide the upper and lower intermediate cylinders 126 and 128 back into their starting position.

It is not necessary when using the illustrated setting head 13 to operate with a metal washer 41. While the upper sheet metal part is a metallic sheet metal part, i.e. not an organic sheet metal part, the metal washer can be dispensed with and the corresponding end of the auxiliary joining part 45 can be directly connected by embossing with the metallic sheet metal part.

It should also be pointed out that the die button 15 can also be designed similarly to the setting head 13 so that there also the corresponding end of the auxiliary joining part can be joined by means of embossing the metal washer 43 or to the lower sheet metal part when the latter is a metallic sheet metal part. For this it is simply necessary to provide the upper end of the fixed inner upper cylinder 112 with a somewhat smaller internal diameter and to provide the upper end, corresponding to the lower end of the pressure plunger of FIG. 9A with cutouts and plunger tongues arranged there between. Such plunger tongues of the upper inner cylinder 112 of the die button can correspond in cross-sectional shape and size to those of the pressure plunger. The cutouts can have an axial depth which is smaller than that of the longitudinal slots 168 of the pressure plunger 162.

Furthermore, it should be mentioned that the metal washer 41 and/or the metal washer 43 do not in any way have to be previously pierced, but rather the piercing in these washers could take place by means of the auxiliary joining part during the piercing in the same operation as the piercing of the sheet metal parts takes place.

Normally, the auxiliary joining parts that are used are somewhat stronger than a bolt of the class 8 in accordance with the DIN norm, this is however not essential, it depends on the strength of the parts that are to be connected.

The component assembly of the present invention is expediently such that the at least one shaft recess 55 is formed as a circumferential groove. Alternatively the at least one shaft recess may be formed as a thread. In another embodiment a plurality of shaft recesses 55, in particular a plurality of parallel circumferential grooves, are provided at the shaft surface of the piercing section 53. Moreover the undercut may expediently have the same shaping or design as the shaft recess, so that the functional part is symmetrical and it does not matter which way round it is inserted into the stacked arrangement.

In the component assembly of the invention the organic sheet metal part may consist of a composite material, in particular of a fiber reinforced duroplastic material or a fiber reinforced thermoplastic material.

It is particularly expedient when the lower sheet metal part 19 is formed as an organic sheet metal part and the metal washer 43 is arranged at the lower side of the lower sheet metal part. Alternatively, the upper sheet metal part 17 may be formed as an organic sheet metal part and the metal washer 41 is then arranged at the upper side of the upper sheet metal part.

In another embodiment of the invention both the upper sheet metal part 17 and also the lower sheet metal part 19 are formed as organic sheet metal parts, with a lower metal washer 43 contacting the lower side of the lower organic sheet metal part 19, an upper metal washer 41 aligned with the lower metal washer 43 contacting the upper side of the upper organic sheet metal part 17 and the auxiliary joining part 45 extending through the apertures 47 of both metal washers 41, 43.

The auxiliary joining part 45 is expediently formed as a cylindrical part with an at least substantially constant cross-sectional shape and size apart from the undercut of the shaft recess. Moreover, the auxiliary joining part 45 is preferably formed as a cylindrical part having a cross-sectional shape and size which, apart from any undercuts which may optionally be provided at the first and second ends, is at least substantially constant over its entire length.

The present invention also comprises a setting head 13 for carrying out the methods described herein and for the manufacture of any component assembly as described herein.

The present invention also extends to a die button 15 for carrying out any of the methods described herein or for manufacture of any of the component assemblies described herein.

REFERENCE NUMERAL LIST

11 punching tool
13 setting head
15 die button
16 central longitudinal axis
17 upper sheet metal part
19 lower sheet metal part
20 inner plunger 21 outer plunger
22 hold-down member
25 end face
27 plunger projection
29 internal space
31 mount
33 base
35 die button projection
37 channel
41 upper metal washer
43 lower metal washer
45 auxiliary joining part
47 aperture
51 functional section
53 piercing section
55 shaft groove
59 piercing slug
60 component assembly
100 upper part of the housing
102 lower part of the housing
104 bolts
106 fixed cylinder
108 fixed aperture disc
110 fixed spacer cylinder
112 fixed inner cylinder with die button projection 35
114 central passage for the disposal of piercing slugs
116 fixed outer cylinder of the die button
118 cylindrical hollow space
120 spring pack
122 movable support ring
124 blade springs
126 upper axially movable intermediate cylinder
128 lower axially movable intermediate cylinder
130 pressure pins
132 axially parallel bores of the aperture disc 108
140 upper part of the housing of the setting head 13
142 lower part of the housing of the setting head 13
144 bolts
146 spring abutment
148 central longitudinal axis of the setting head 13
150 compression coil spring
152 bolt
154 solid disc
156 cylinder space of the lower housing part 142
158 axially movable sleeve
160 aperture disc
162 pressure plunger
164 apertured ring
166 sleeve
167 conical outer surface
168 longitudinal slits of the pressure plunger
170 plunger tongues
172 nose piece
173 base section
174 pressure pins
176 mount for the auxiliary joining part 45
178 impressions
S piercing direction

The invention claimed is:

1. A method for the connection of an upper sheet metal part (17) and a lower sheet metal part (19) of which at least one is executed as an organic sheet composite part, with the aid of an auxiliary joining part (45) and at least one metal washer (41, 43) having an aperture, wherein the auxiliary joining part (45) has first and second ends, there being a functional section (51) with an undercut (56) at one of said ends and a piercing section (53) with a lateral shaft surface and a shaft recess (55) formed therein at the other of said ends, the method comprising the following steps:
   i) the upper sheet metal part (17), the lower sheet metal part (19) and the metal washer (41, 43) are brought into a stacked arrangement in such a way that the metal washer (41, 43) contacts the organic sheet composite part,
   ii) the piercing section (53) of the auxiliary joining part (45) is used in order to pierce a slug (59) from the stacked sheet metal part (17, 19),
   iii) either the functional section (51) or the piercing section (53) is passed through an aperture (47) of the metal washer (41, 43) until the undercut (56) or the at least one shaft recess (55) is at least partly surrounded by washer material,
   iv) an adequate pressure is exerted on the metal washer (41, 43) in order to drive washer material into the at least one shaft recess (55) or into the undercut (56) and thereby to join the auxiliary joining part (45) to the metal washer (41, 43), and
   v) the other respective one of the undercut or of the shaft recess is brought into a holding engagement with a sheet metal part not formed as an organic sheet composite part or with a further metal washer (41, 43), with the sheet metal part not formed as an organic sheet composite part or with the further metal washer being located at the side of the stacked arrangement remote from the first metal washer.

2. A method in accordance with claim 1, wherein the same shaping is selected for the undercut as for the shaft recess.

3. A method in accordance with claim 1, wherein the metal washer (43) is positioned at a lower side of the lower sheet metal part (19) which is executed as an organic sheet composite part by means of a die button (15) which has a mount (31) for the metal washer (43) and a passage (37) for leading away the piercing slug (59).

4. A method in accordance with claim 3, wherein in step (iv) the metal washer (43) is deformed in the region of the rim of the aperture (47) by means of at least one projection (35) provided in the mount (31) of the die button (15), the projection optionally being a ring projection.

5. A method in accordance with claim 1, wherein the metal washer (41) is positioned by means of a setting head (13) at the upper side of the upper sheet metal part (17) executed as an organic sheet composite part, the setting head having a plunger and the auxiliary joining part (45) being passed through the aperture (47) of the metal washer (41) by means of the plunger (20) of the setting head (13) acting on the functional section (51).

6. A method in accordance with claim 5, wherein in the step (iv) the metal washer (41) is deformed in the region of the rim of the aperture (47) of this metal washer (41) by means of a projection (27) provided at a lower side of an outer plunger (21) of the setting head (13) acting on the sheet metal washer (41), the projection (27) provided at the lower side of the outer plunger optionally being a ring projection.

7. A method in accordance with claim 1, wherein both the upper sheet metal part (17) and also the lower sheet metal part (19) are formed as organic sheet composite parts, with a lower metal washer (43) being positioned by means of a die button (15) at the lower side of the lower organic sheet composite part (19) and an upper metal washer (41) being positioned at an upper side of the upper organic sheet composite part (17) by means of a setting head (13) and being aligned with the lower metal washer (43).

8. A method in accordance with claim 1, wherein the sheet metal parts are pressed against one another in the step (ii).

9. A method for the connection of an upper sheet metal part (17) and of a lower sheet metal part (19) of which at least one is formed as an organic sheet composite part, with the aid of an auxiliary joining part (45) which has a first end and a second end and also with the aid of a pierced metal washer (41, 43), the method comprising the following steps:
- (i) the upper sheet metal part (17), the lower sheet metal part (19) and the metal washer (41, 43) are brought into a stacked arrangement in such a way that the metal washer (41, 43) contacts the organic sheet composite part,
- (ii) a piercing section (53) of the auxiliary joining part (45) is exploited to punch a slug (59) from the stacked sheet metal parts (17, 19),
- (iii) the first end of the auxiliary joining part is passed through an aperture (47) of the metal washer (41, 43) to such an extent that it is at least partly surrounded by washer material, and, either,
- (iva) an adequate pressure is exerted onto the sheet metal washer (41, 43) in order to drive washer material into at least one undercut (56) of the first end of the auxiliary joining part (45), in order to join the auxiliary joining part (45) to the metal washer (41, 43), or
- (ivb) the first end of the auxiliary joining part (45) is embossed in order to hereby join the auxiliary joining part (45) in the region of the first end to the metal washer and the second end of the auxiliary joining part (45) either
- (va) is brought by embossing into a holding engagement with a sheet metal part not executed as an organic sheet composite part or with a further metal washer (41, 43), with the sheet metal part not executed as an organic sheet composite part or the metal washer being located at the side of the stacked arrangement remote from the first metal washer, or
- (vb) is joined by deformation of the sheet metal part not executed as an organic sheet composite part or by deformation of a further metal washer (41, 43) to the sheet metal part not executed as an organic sheet composite part or to the further metal washer, with the sheet metal part not executed as an organic sheet composite part or the further metal washer being located at the side of the stacked arrangement remote from the first metal washer.

10. A method in accordance with claim 9, wherein the metal washer (43) is positioned at a lower side of the lower sheet metal part (19) which is executed as an organic sheet composite part, by means of a die button (15) which has a mount (31) for the metal washer (43) and a passage (114) for leading away the piercing slug (59).

11. A method in accordance with claim 9, wherein both the upper sheet metal part (17) and also the lower sheet metal part (19) are executed as organic sheet composite parts, with a lower metal washer (43) being positioned by means of a die button (15) at the lower side of the lower organic sheet composite part (19) and an upper sheet metal washer (14) being positioned by means of a setting head (13) at an upper side of the upper organic sheet composite part (17) and aligned with the lower metal washer (43).

12. A method in accordance with claim 9, wherein the sheet metal parts (17, 19) are pressed against one another in step (ii).

13. A component assembly (60) having a stacked arrangement consisting of an upper sheet metal part (17) and a lower sheet metal part (19), of which at least one is formed as an organic sheet composite part, with an auxiliary joining part (45) and with at least one apertured metal washer (41, 43), wherein the auxiliary joining part (45) has a functional section (51) having an undercut (56) at one end and also has a piercing section (53) at the other end having a lateral shaft surface and a shaft recess (55) formed therein, wherein the metal washer (41, 43) contacts a surface of the organic sheet composite part, with the functional section (51) or the piercing section (53) extending through an aperture (47) of the metal washer (41, 43) and wherein washer material has been driven into the undercut (56) or into the at least one shaft recess (55), whereby the auxiliary joining part (45) is joined to the metal washer (41, 43) and wherein the other respective one of the undercut or of the shaft recess is in a holding engagement with a sheet metal part not formed as an organic sheet composite part or with a further metal washer (41, 43), with the sheet metal part not executed as an organic sheet composite part or the further metal washer being located at a side of the stacked arrangement remote from the first metal washer.

14. A component assembly (60) with a stacked arrangement of an upper sheet metal part (17) and a lower sheet metal part (19) of which at least one is formed as an organic sheet composite part, with an auxiliary joining part (45) having a first end and a second end and with at least one apertured metal washer (41, 43), with the metal washer (41, 43) contacting a surface of the organic sheet composite part, with the first end of the auxiliary joining part (45) extending through an aperture (47) of the metal washer (41, 43) and either being joined to the metal washer (41) by embossing of the auxiliary joining part; or with washer material being so deformed that it is driven into an undercut of the auxiliary joining part, whereby the auxiliary joining part (45) is likewise joined to the metal washer (41, 43); and wherein the second end of the auxiliary joining part is either in a holding engagement with a sheet metal part not formed as an organic sheet composite part or with a further metal washer (43), with the sheet metal part not formed as an organic sheet composite part or the metal washer being located at the side of the stacked arrangement remote from the first metal washer (41).

15. A component assembly in accordance with claim 14, wherein the second end of the auxiliary joining part either has an embossing whereby it is joined to the sheet metal part not formed as an organic sheet composite part or to the further metal washer (43); or is joined to the sheet metal part not formed as an organic sheet composite part or to the further metal washer (43) by a deformation of the material of the sheet metal part not formed as an organic sheet composite part or of the further metal washer (43) into an undercut of the auxiliary joining part.

16. A component assembly in accordance with claim 14, wherein both the upper sheet metal part (17) and also the lower sheet metal part (19) are formed as organic sheet composite parts, with a lower metal washer (43) contacting the lower side of the lower sheet metal part (19), with an upper metal washer (41) contacting the upper side of the upper organic sheet composite part (17) and being aligned with the lower metal washer (43); and with the auxiliary joining part (45) extending through the apertures (47) of both metal washers (41, 43).

* * * * *